(12) United States Patent
Cai et al.

(10) Patent No.: US 11,870,095 B2
(45) Date of Patent: Jan. 9, 2024

(54) METHOD FOR TREATING WASTE DIAPHRAGM PAPER OF LITHIUM BATTERY

(71) Applicants: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP EV RECYCLING CO., LTD., Changsha (CN)

(72) Inventors: Haibing Cai, Changsha (CN); Qiang Li, Changsha (CN); Changdong Li, Changsha (CN); Ruokui Chen, Changsha (CN); Song Chen, Changsha (CN)

(73) Assignees: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP EV REYCLING CO., LTD., Changsha (CN)

( * ) Notice: Subject to any disclaimer, the term of this patent is extended or adjusted under 35 U.S.C. 154(b) by 0 days.

(21) Appl. No.: 18/043,881

(22) PCT Filed: May 12, 2021

(86) PCT No.: PCT/CN2021/093183
§ 371 (c)(1),
(2) Date: Mar. 2, 2023

(87) PCT Pub. No.: WO2022/052497
PCT Pub. Date: Mar. 17, 2022

(65) Prior Publication Data
US 2023/0246294 A1    Aug. 3, 2023

(30) Foreign Application Priority Data

Sep. 9, 2020    (CN) .......................... 202010938775.9

(51) Int. Cl.
$H01M\ 50/403$    (2021.01)
$H01M\ 6/52$    (2006.01)
(Continued)

(52) U.S. Cl.
CPC ............. $H01M\ 50/403$ (2021.01); $B09B\ 3/30$ (2022.01); $B09B\ 3/35$ (2022.01); $B09B\ 3/70$ (2022.01);
(Continued)

(58) Field of Classification Search
None
See application file for complete search history.

(56) References Cited

FOREIGN PATENT DOCUMENTS

CN    106591582 A    4/2017
CN    108588423 A    9/2018
(Continued)

OTHER PUBLICATIONS

International Search Report and Written Opinion in PCT/CN2021/093183 dated Aug. 10, 2021.
(Continued)

*Primary Examiner* — Robert S Carrico
(74) *Attorney, Agent, or Firm* — Buchalter; Jason W. Croft

(57) ABSTRACT

The present invention relates to the field of waste battery recycling, and discloses a method for treating waste diaphragm paper of a lithium battery, which includes the following steps of: (1) shearing and crushing waste diaphragm paper, and then carrying out pneumatic separation to obtain a light material and a copper-aluminum mixture; (2) putting the light material into a flotation machine for sepa-
(Continued)

ration to obtain diaphragm paper and battery powder; and (3) pulping the battery powder, and then carrying out leaching of hydrometallurgy, pickling the diaphragm paper, and then filtering and spin-drying to obtain the diaphragm paper. According to the method, the diaphragm paper is treated by a method combining physics and chemistry, so that valuable metals in the waste diaphragm paper of the lithium battery are effectively recycled, and the industrial production requirements of environmental friendliness, low energy consumption and high resource recycling are satisfied.

5 Claims, 1 Drawing Sheet

(51) Int. Cl.
  *H01M 10/0525* (2010.01)
  *H01M 10/54* (2006.01)
  *B09B 3/35* (2022.01)
  *B09B 3/70* (2022.01)
  *B09B 3/30* (2022.01)
  *B09B 101/16* (2022.01)

(52) U.S. Cl.
  CPC ......... *H01M 6/52* (2013.01); *H01M 10/0525* (2013.01); *H01M 10/54* (2013.01); *B09B 2101/16* (2022.01); *Y02W 30/84* (2015.05)

(56) References Cited

FOREIGN PATENT DOCUMENTS

| | | |
|---|---|---|
| CN | 109193064 A | 1/2019 |
| CN | 109904545 A | 6/2019 |
| CN | 112275765 A | 1/2021 |
| CN | 112275765 B | 8/2022 |
| JP | 2012195073 A | 10/2012 |
| KR | 20120045701 A * | 5/2012 ............ H01M 10/54 |
| WO | 2022052497 A1 | 3/2022 |

OTHER PUBLICATIONS

First Office Action in Chinese Application CN202010938775.9 dated Aug. 27, 2021.
First Search in Chinese Application CN202010938775.9 dated Aug. 20, 2021.
Second Office Action in Chinese Application CN202010938775.9 dated Feb. 9, 2022.
Supplementary Search in Chinese Application CN202010938775.9 dated May 25, 2022.
Notification to Grant Patent Right for Invention in Chinese Application CN202010938775.9 dated Jun. 1, 2022.

* cited by examiner

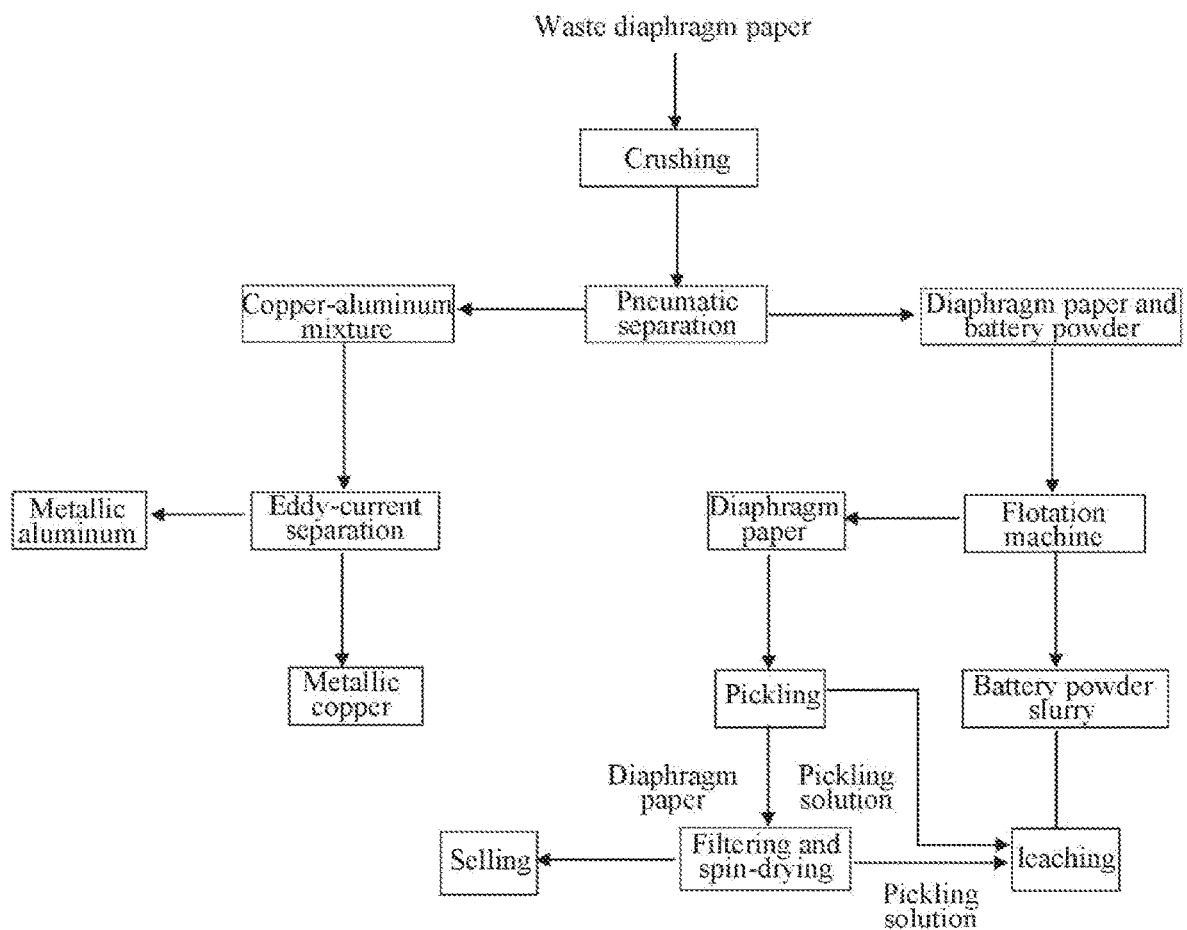

METHOD FOR TREATING WASTE DIAPHRAGM PAPER OF LITHIUM BATTERY

CROSS-REFERENCE TO RELATED APPLICATION

The present application is a national phase entry under 35 USC § 371 of International Application PCT/CN2021/093183, filed May 12, 2021, which claims the benefit of and priority to Chinese Patent Application No. 202010938775.9, filed Sep. 9, 2020, the entire disclosures of which are incorporated herein by reference.

TECHNICAL FIELD

The invention relates to the field of recycling waste lithium batteries, and particularly to a method for treating waste diaphragm paper of a lithium battery.

BACKGROUND

Lithium batteries are chemical batteries that rely on lithium ions to shuttle between cathodes and anodes to achieve charging and discharging purposes, which have the advantages of high energy density, high working voltage, long cycle life and large charging and discharging rates, and are widely used in the fields of new energy vehicles, 3C consumer products and energy storage batteries, where 3C refers to the abbreviation of computer, communication and consumer electronic products. The main components of a lithium ion battery include a cathode, an anode, shell, electrolyte and diaphragm paper. In the present dry process for treating waste lithium batteries, a large amount of valuable metals still remain in the recycled diaphragm paper, which will cause serious environmental pollution and waste of resources if the valuable metals are not utilized.

At present, the most commonly used method for treating diaphragm paper is an incineration method, which has high energy consumption, long process and low metal recycling rate. Especially, when the diaphragm paper is treated by the incineration method, on one hand, the residual metallic aluminum that serves as a cathode collector is very easy to melt due to its low melting point, which will penetrate into the battery powder, causing difficulties in separating valuable metals, and being not conducive to industrial production. On the other hand, the diaphragm paper cannot be recycled through the incineration method, resulting in waste of resources.

SUMMARY

An object of the present invention is to provide a method for treating waste diaphragm paper of a lithium battery which is combined with physics and chemistry methods, and can satisfy the industrial production requirements of environmental friendliness, low energy consumption and high resource recycling.

In order to achieve the above object, the present invention adopts the following technical solutions.

A method for treating waste diaphragm paper of a lithium battery includes the following steps of:

(1) shearing and crushing waste diaphragm paper, and then carrying out pneumatic separation to obtain a light material and a copper-aluminum mixture;

(2) putting the light material into a flotation machine for separation to obtain diaphragm paper and battery powder; and (3) pulping the battery powder, and then carrying out leaching of hydrometallurgy, pickling the diaphragm paper, and then filtering and spin-drying to obtain the diaphragm paper.

Preferably, in step (1), the crushed material after shearing and crushing has a size ranging from 1 mm to 3 mm.

Preferably, in step (1), the pneumatic separation is carried out at a speed of 2 m/s to 3 m/s.

Preferably, in step (1), the method further includes a step of putting the copper-aluminum mixture into an eddy-current separator for separation to obtain metallic copper and metallic aluminum.

More preferably, a rotor speed of the eddy-current separator ranges from 20 Hz to 40 Hz, a belt speed of the eddy-current separator ranges from 10 Hz to 15 Hz, and a feeding speed is 30% to 40% of a unit time treatment capacity of the eddy-current separator.

Preferably, in step (2), a stirring speed of the flotation machine ranges from 200 r/min to 400 r/min, and a scraper speed of the flotation machine ranges from 40 r/min to 80 r/min.

Preferably, in step (3), the pulping the battery powder is to prepare the battery powder into a slurry with a mass concentration of 30% to 35%.

Preferably, in step (3), the specific operation of the leaching of hydrometallurgy is: making the battery powder into a slurry, adding the slurry into a pickling solution for pickling, then adding a reducing agent for reductive leaching, and adjusting a pH to be acidic to obtain leachate.

More preferably, the pickling solution is sulfuric acid; the reducing agent is one of perhydro or sodium sulphite; and the adjusting the pH to be acidic refers to adjusting the pH to a range of 1.5 to 2.0.

Preferably, in step (3), the pickling solution used in the pickling is sulfuric acid with a concentration of 0.5 mol/L to 1.5 mol/L.

Preferably, in step (3), in the process of pickling the diaphragm paper, a mass ratio of the diaphragm paper to the pickling solution is 1:(5 to 10).

Preferably, in step (3), the pickling is carried out at a rotating speed ranging from 200 r/min to 400 r/min, and the pickling lasts for 10 minutes to 30 minutes.

Preferably, in step (3), a mesh number of a filter screen used in the filtering process ranges from 60 meshes to 100 meshes; and a centrifuge is used in the spin-drying process, and a rotating speed of the centrifuge ranges from 4,000 r/min to 5,000 r/min.

More preferably, both the pickling solution after the pickling and the pickling solution after spin-drying may be used for leaching of hydrometallurgy of the battery slurry.

Preferably, the diaphragm paper obtained in step (3) may be used for plastic granulation.

The treatment principle of the present invention is as follows:

According to the present invention, the diaphragm paper is treated by a method combining physics and chemistry, and the waste diaphragm paper is firstly sheared and crushed, and then subjected to pneumatic separation to obtain a light material and a heavy material; the light material diaphragm paper and the battery powder are subjected to flotation and separation to obtain the battery powder slurry and the diaphragm paper; the heavy material copper-aluminum mixture is subjected by eddy-current separation; the battery powder slurry after separation is transported to a wet section for treatment by a pump, the diaphragm paper after separation is pickled, and then the pickled diaphragm paper is filtered and spin-dried by a centrifuge, and then sold for plastic granulation; a physical method is used to separate metallic copper and metallic aluminum from the diaphragm paper and separate the diaphragm paper from the battery powder; and then, the valuable metals nickel, cobalt and manganese adhered in the diaphragm paper are separated by a chemical method, so that the valuable metals in the diaphragm paper are effectively recycled, three-wastes are not produced in the production process, and the industrial production requirements of environmental friendliness, low energy consumption and high resource recycling are satisfied.

The present invention has the advantages as follows:

According to the method, the diaphragm paper is treated by a method combining physics and chemistry, so that valuable metals in the waste diaphragm paper of the lithium battery are effectively recycled, and the recycled diaphragm paper can be used in the lithium battery again, which satisfies the industrial production requirements of environmental friendliness, low energy consumption and high resource recycling.

BRIEF DESCRIPTION OF DRAWINGS

FIG. 1 is a process flowchart of Embodiment 1 of the present invention.

DETAILED DESCRIPTION

In order to deeply understand the present invention, the preferred experimental solutions of the present invention will be described below with reference to the embodiments to further illustrate the characteristics and advantages of the present invention. Any change or change that does not deviate from the main idea of the present invention can be understood by those skilled in the art, and the protection scope of the present invention is determined by the scope of the claims.

Embodiment 1

A method for treating waste diaphragm paper of a lithium battery included the following steps of:

(1) putting waste diaphragm paper containing 15.72% copper, 8.26% aluminum, 4.84% nickel and 8.92% cobalt into a shear crusher to be crushed into a regular shape with a size of 3 mm×3 mm, and then putting the same into a cyclone separator with an airflow speed of 2.2 m/s for pneumatic separation to obtain a light material and a copper-aluminum mixture;

(2) putting the copper-aluminum mixture into an eddy-current separator with a rotor speed of 40 Hz and a belt speed of 12 Hz for separation to obtain metallic copper and metallic aluminum;

(3) putting the light material into a flotation machine with a stirring speed of 300 r/min and a scraper speed of 50 r/min for separation to obtain diaphragm paper and battery powder; and (4) pulping the battery powder, adding the battery powder to sulfuric acid for pickling, adding hydrogen peroxide for reductive leaching, adjusting a pH to 1.5 to obtain leachate, pickling the diaphragm paper with dilute sulfuric acid with a concentration of 0.5 mol/L, a mass ratio of the diaphragm paper to the pickling solution being 1:10, a rotating speed being 200 r/min, and the pickling lasting for 10 minutes, then filtering with a 60-mesh linear sieve, and spin-drying with a horizontal spiral discharge centrifuge with a rotating speed of 5,000 r/min, thus obtaining the diaphragm paper.

The diaphragm paper, the metallic copper, the metallic aluminum and the battery powder slurry were obtained after the above treatment steps, where the contents of various metals in the diaphragm paper were: 0.12% copper, 0.26% aluminum, 0.14% nickel and 0.23% cobalt; the contents of various metals in the metallic copper were: 98.22% copper, 0.68% aluminum, 0.32% nickel and 0.51% cobalt; the contents of various metals in the metallic aluminum were: 4.86% copper, 90.93% aluminum, 0.82% nickel and 1.33% cobalt; and the impurity contents of the battery powder slurry were detected to be: 1.05% copper, 0.84% aluminum, 15.22% nickel and 21.08% cobalt. The diaphragm paper, the metallic copper and the metallic aluminum may be sold directly, and valuable metals may be recovered from the battery powder slurry by leaching of hydrometallurgy. The separation rate of the metallic copper and the metallic aluminum is 92.3%.

Embodiment 2

A method for treating waste diaphragm paper of a lithium battery included the following steps of:

(1) putting waste diaphragm paper containing 13.72% copper, 8.86% aluminum, 5.84% nickel and 7.92% cobalt into a shear crusher to be crushed into a regular shape with a size of 3 mm×3 mm, and then putting the same into a cyclone separator with an airflow speed of 2.2 m/s for pneumatic separation to obtain a light material and a copper-aluminum mixture;

(2) putting the copper-aluminum mixture into an eddy-current separator with a rotor speed of 40 Hz and a belt speed of 12 Hz for separation to obtain metallic copper and metallic aluminum;

(3) putting the light material into a flotation machine with a stirring of 400 r/min and a scraper speed of 60 r/min for separation to obtain diaphragm paper and battery powder; and (4) pulping the battery powder, adding the battery powder to sulfuric acid for pickling, adding hydrogen peroxide for reductive leaching, adjusting a pH to 1.5 to obtain leachate, pickling the diaphragm paper with dilute sulfuric acid with a concentration of 1.0 mol/L, a mass ratio of the diaphragm paper to the pickling solution being 1:10, a rotating speed being 300 r/min, and the pickling lasting for 20 minutes, then filtering with a 80-mesh linear sieve, and spin-drying with a horizontal spiral discharge centrifuge with a rotating speed of 5,000 r/min, thus obtaining the diaphragm paper.

The diaphragm paper, the metallic copper, the metallic aluminum and the battery powder slurry were obtained after the above treatment steps, where the contents of various metals in the diaphragm paper were: 0.11% copper, 0.22% aluminum, 0.12% nickel and 0.13% cobalt; the contents of various metals in the metallic copper were: 98.26% copper, 0.78% aluminum, 0.36% nickel and 0.41% cobalt; the contents of various metals in the metallic aluminum were: 3.86% copper, 92.93% aluminum, 0.82% nickel and 1.23% cobalt; and the impurity contents of the battery powder slurry were detected to be: 1.15% copper, 0.74% aluminum, 16.21% nickel and 20.32% cobalt. The diaphragm paper, the metallic copper and the metallic aluminum may be sold directly, and valuable metals may be recovered from the battery powder slurry by leaching of hydrometallurgy. The separation rate of the metallic copper and the metallic aluminum is 94.3%.

Embodiment 3

A method for treating waste diaphragm paper of a lithium battery included the following steps of:

(1) putting waste diaphragm paper containing 9.72% % copper, 10.86% aluminum, 6.84% nickel and 6.92% cobalt into a shear crusher to be crushed into a regular shape with a size of 3 mm×3 mm, and then putting the same into a cyclone separator with an airflow speed of 2.8 m/s for pneumatic separation to obtain a light material and a copper-aluminum mixture;

(2) putting the copper-aluminum mixture into an eddy-current separator with a rotor speed of 40 Hz and a belt speed of 12 Hz for separation to obtain metallic copper and metallic aluminum;

(3) putting the light material into a flotation machine with a stirring of 400 r/min and a scraper speed of 70 r/min for separation to obtain diaphragm paper and battery powder; and (4) pulping the battery powder, adding the battery powder to sulfuric acid for pickling, adding hydrogen peroxide for reductive leaching, adjusting a pH to 1.5 to obtain leachate, pickling the diaphragm paper with dilute sulfuric acid with a concentration of 1.5 mol/L, a mass ratio of the diaphragm paper to the pickling solution being 1:5, a rotating speed being 300 r/min, and the pickling lasting for 30 minutes, then filtering with a 100-mesh linear sieve, and spin-drying with a horizontal spiral discharge centrifuge with a rotating speed of 4,000 r/min, thus obtaining the diaphragm paper.

The diaphragm paper, the metallic copper, the metallic aluminum and the battery powder slurry were obtained after the above treatment steps, where the contents of various metals in the diaphragm paper were: 0.11% copper, 0.32% aluminum, 0.12% nickel and 0.08% cobalt; the contents of various metals in the metallic copper were: 98.66% copper, 0.68% aluminum, 0.46% nickel and 0.39% cobalt; the contents of various metals in the metallic aluminum were: 3.46% copper, 93.13% aluminum, 0.62% nickel and 0.73% cobalt; and the impurity contents of the battery powder slurry were detected to be: 0.98% copper, 0.76% aluminum, 16.02% nickel and 20.58% cobalt. The diaphragm paper, the metallic copper and the metallic aluminum may be sold directly, and valuable metals may be recovered from the battery powder slurry by leaching of hydrometallurgy. The separation rate of the metallic copper and the metallic aluminum is 94.83%.

The results of various metal contents in the diaphragm paper, the metallic copper, the metallic aluminum and the battery powder slurry treated in Embodiment 1 are shown in Table 1.

TABLE 1

|  | Copper (%) | Aluminum (%) | Nickel (%) | Cobalt (%) |
| --- | --- | --- | --- | --- |
| Diaphragm paper | 0.12 | 0.26 | 0.14 | 0.23 |
| Metallic copper | 98.22 | 0.68 | 0.32 | 0.51 |
| Metallic aluminum | 4.86 | 90.93 | 0.82 | 1.33 |
| Battery powder slurry | 1.05 | 0.84 | 15.22 | 21.08 |

The results of various metal contents in the diaphragm paper, the metallic copper, the metallic aluminum and the battery powder slurry treated in Embodiment 2 are shown in Table 2.

TABLE 2

|  | Copper (%) | Aluminum (%) | Nickel (%) | Cobalt (%) |
| --- | --- | --- | --- | --- |
| Diaphragm paper | 0.11 | 0.22 | 0.12 | 0.13 |
| Metallic copper | 98.26 | 0.78 | 0.36 | 0.41 |
| Metallic aluminum | 4.86 | 92.93 | 0.82 | 1.23 |
| Battery powder slurry | 1.15 | 0.74 | 16.21 | 20.32 |

The results of various metal contents in the diaphragm paper, the metallic copper, the metallic aluminum and the battery powder slurry treated in Embodiment 3 are shown in Table 3.

TABLE 3

|  | Copper (%) | Aluminum (%) | Nickel (%) | Cobalt (%) |
| --- | --- | --- | --- | --- |
| Diaphragm paper | 0.11 | 0.32 | 0.12 | 0.08 |
| Metallic copper | 98.66 | 0.68 | 0.46 | 0.39 |
| Metallic aluminum | 3.46 | 93.13 | 0.62 | 0.73 |
| Battery powder slurry | 0.98 | 0.76 | 16.02 | 20.58 |

It can be seen from Tables 1 to 3 that the diaphragm paper treated by the method of the present invention contains very less of valuable metals, and may be used for plastic granulation. However, the diaphragm paper is treated by incineration at present, which wastes resources and pollutes the environment. According to the method of the present invention, the recycling rate of the metallic copper according to the method can reach over 98.2%, and the recycling rate of the metallic aluminum can reach over 90.9%, while the nickel, the cobalt and the manganese in the battery powder slurry can be recovered by leaching of hydrometallurgy, and can be used for the preparation of battery cathode materials again.

The method for treating the waste diaphragm paper of the lithium battery provided by the present invention has been introduced in detail above, and the principle and implementation of the present invention have been illustrated with specific embodiments. The explanation of the above embodiments is only used to help understand the method and the core idea of the present invention, including the best mode, and also enables any person skilled in the art to practice the present invention, including manufacturing and using any device or system, and implementing any combined method. It should be pointed out that for those of ordinary skills in the art, several improvements and modifications can be made to the present invention without departing from the principle of the present invention, and these improvements and modifications also fall within the protection scope of the claims of the present invention. The protection scope of the present invention is defined by the claims, and may include other embodiments that can be thought of by those skilled in the art. If these other embodiments have structural elements that are not different from the literal expression of the claims, or if they include equivalent structural elements that are not materially different from the literal expression of the claims, these other embodiments should also be included in the scope of the claims.

The invention claimed is:

1. A method for treating waste diaphragm paper of a lithium battery, comprising the following steps of:
   (1) shearing and crushing waste diaphragm paper, and then carrying out pneumatic separation to obtain a light material and a copper-aluminum mixture;
   (2) putting the light material into a flotation machine for separation to obtain diaphragm paper and battery powder; and
   (3) pulping the battery powder, and then carrying out leaching of hydrometallurgy, pickling the diaphragm paper, and then filtering and spin-drying to obtain the diaphragm paper;
   wherein, in step (1), the method further comprises a step of putting the copper-aluminum mixture into an eddy-current separator for separation to obtain metallic copper and metallic aluminum; a rotor speed of the eddy-current separator ranges from 20 Hz to 40 Hz and a belt speed of the eddy-current separator ranges from 10 Hz to 15 Hz;
   in step (3), the specific operation of the leaching of hydrometallurgy is: after pulping the battery powder into a slurry, adding the slurry into a pickling solution for pickling, then adding a reducing agent for reductive leaching, and adjusting a pH to be acidic to obtain leachate; and
   in step (3), in the process of pickling the diaphragm paper, the pickling solution used in the pickling is sulfuric acid with a concentration of 0.5 mol/L to 1.5 mol/L; the pickling is carried out at a rotating speed ranging from 200 r/min to 400 r/min, and the pickling lasts for 10 minutes to 30 minutes; and
   a mass ratio of the diaphragm paper to the pickling solution is 1:(5 to 10).

2. The method according to claim 1, wherein in step (1), the pneumatic separation is carried out at a speed of 2 m/s to 3 m/s.

3. The method according to claim 1, wherein in step (2), a stirring speed of the flotation machine ranges from 200 r/min to 400 r/min, and a scraper speed of the flotation machine ranges from 40 r/min to 80 r/min.

4. The method according to claim 1, wherein in the process of leaching of hydrometallurgy, the pickling solution is sulfuric acid; the reducing agent is one of perhydro or sodium sulphite; and the adjusting the pH to be acidic refers to adjusting the pH to a range of 1.5 to 2.0.

5. The method according to claim 1, wherein in step (3), a mesh number of a filter screen used in the filtering process ranges from 60 meshes to 100 meshes; and a centrifuge is used in the spin-drying process, and a rotating speed of the centrifuge ranges from 4,000 r/min to 5,000 r/min.

* * * * *